(12) United States Patent
Keller

(10) Patent No.: US 7,840,142 B2
(45) Date of Patent: Nov. 23, 2010

(54) SYSTEM AND METHOD FOR REDUCING STANDBY POWER CONSUMPTION

(75) Inventor: Anton Werner Keller, Arni (CH)

(73) Assignee: Thomson Licensing, Boulogne (FR)

( * ) Notice: Subject to any disclaimer, the term of this patent is extended or adjusted under 35 U.S.C. 154(b) by 487 days.

(21) Appl. No.: 11/658,068

(22) PCT Filed: Jul. 22, 2005

(86) PCT No.: PCT/IB2005/002138

§ 371 (c)(1),
(2), (4) Date: Jan. 19, 2007

(87) PCT Pub. No.: WO2006/011032

PCT Pub. Date: Feb. 2, 2006

(65) Prior Publication Data

US 2007/0202932 A1  Aug. 30, 2007

(51) Int. Cl.
H04B 10/00 (2006.01)
H04B 10/06 (2006.01)
H04B 1/16 (2006.01)
G05B 24/02 (2006.01)
H02J 1/00 (2006.01)
H02J 3/12 (2006.01)
B23K 11/24 (2006.01)

(52) U.S. Cl. ............... 398/202; 398/106; 398/115; 398/118; 455/343; 323/318

(58) Field of Classification Search ................. 398/202, 398/203, 205; 370/43
See application file for complete search history.

(56) References Cited

U.S. PATENT DOCUMENTS

| | | | |
|---|---|---|---|
| 4,500,923 A * | 2/1985 | Duvall et al. ............. 348/730 |
| 5,175,441 A * | 12/1992 | den Hollander .......... 307/43 |
| 5,414,475 A | 5/1995 | Trzyna et al. |
| 5,636,288 A | 6/1997 | Bonneville et al. |
| 6,043,994 A | 3/2000 | Keller et al. |
| 6,104,589 A * | 8/2000 | Williamson ........... 361/111 |
| 6,150,798 A * | 11/2000 | Ferry et al. ............ 323/273 |
| 6,208,384 B1 * | 3/2001 | Schultheiss ........... 348/552 |
| 6,292,341 B1 * | 9/2001 | Milanesi et al. ........ 361/79 |
| 6,525,666 B1 * | 2/2003 | Shimoda ............ 340/636.1 |
| 6,636,026 B1 * | 10/2003 | Nomoto ............. 323/318 |
| 6,995,807 B2 * | 2/2006 | Libera ............... 348/730 |
| 7,126,647 B2 * | 10/2006 | Cha et al. ............ 348/730 |
| 7,359,649 B2 * | 4/2008 | Itoh et al. ........... 398/182 |
| 2002/0012258 A1 | 1/2002 | Nagai et al. |
| 2002/0038432 A1 * | 3/2002 | Hsu ................. 713/300 |
| 2002/0171694 A1 * | 11/2002 | Takayanagi ........... 347/5 |
| 2003/0172312 A1 * | 9/2003 | Takahashi et al. ...... 713/300 |

(Continued)

FOREIGN PATENT DOCUMENTS

DE  195 45 659  6/1997
JP  2003167651 A *  6/2003

OTHER PUBLICATIONS

Sakai translation, abstract.*

*Primary Examiner*—Ken N Vanderpuye
*Assistant Examiner*—Oommen Jacob
(74) *Attorney, Agent, or Firm*—Robert D. Shedd

(57) ABSTRACT

The disclosed embodiments relate to a system and method for reducing standby power consumption in an electronic device. There is provided an electronic device (10) comprising receiver circuitry (16), and power supply control circuitry (18) coupled in series with the receiver circuitry (16), wherein a ground connection of the receiver circuitry (16) is coupled to a voltage supply connection of the power supply control circuitry (18).

19 Claims, 2 Drawing Sheets

U.S. PATENT DOCUMENTS

2003/0179048 A1* 9/2003 Kolsrud et al. .............. 330/296
2003/0214819 A1 11/2003 Nakagawa
2004/0063464 A1* 4/2004 Akram et al. ............... 455/559
2004/0243861 A1* 12/2004 Sakai ........................ 713/300
2005/0041360 A1* 2/2005 Dettweiler .................. 361/160
2006/0156047 A1* 7/2006 Ito et al. ..................... 713/310

* cited by examiner

SYSTEM AND METHOD FOR REDUCING STANDBY POWER CONSUMPTION

FIELD OF THE INVENTION

The present invention relates generally to reducing the standby power consumption of an electronic device. More specifically, the present invention relates to a system for reducing power consumption of a power supply control circuitry.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Historically, electronic devices, such as consumer electronics equipment, were powered "on" or powered "off" by mechanical or electromechanical switches. For example, a television could be turned on or turned off with a mechanical knob. Turning the mechanical knob from the off position to the on position connected two electrical contacts that electrically coupled a power supply to the television's display system.

Beginning in approximately 1980, however, power control for electronic devices, especially consumer electronics equipment, began to move away from mechanical switches towards transistor-based switches. Transistor-based switches can be turned on by applying a current to the transistor. Because transistor-based switches do not require physical movement, they greatly expanded the power control options for electronic devices. For example, with a transistor based switch, a television could turn itself on or off when it received an electronic command signal (e.g., a remote control signal). This electronic signal could be generated by a remote controlled unit, such as an infrared remote control or by a switch mounted on the television itself.

Electronic devices employing transistor-based switches comprise a receiver that is configured to receive a signal from a remote device. Because the receiver does not know when a command signal may be received, the receiver is typically configured to remain "on" even when the electronic device appears to be "off." This mode is referred to as "standby mode," and the power drawn during standby mode (i.e., the power for the receiver) is referred to as "standby power."

Reducing the standby power consumption of electronic devices is desirable.

SUMMARY OF THE INVENTION

Certain aspects commensurate in scope with the originally claimed invention are set forth below; however the invention may encompass a variety of aspects that may not be set forth below.

The disclosed embodiments relate to a system and method for reducing standby power consumption in an electronic device. There is provided an electronic device (10) comprising receiver circuitry (16), and power supply control circuitry (18) coupled in series with the receiver circuitry (16), wherein a ground connection of the receiver circuitry (16) is coupled to a voltage supply connection of the power supply control circuitry (18).

DETAILED DESCRIPTION

Figure 1:
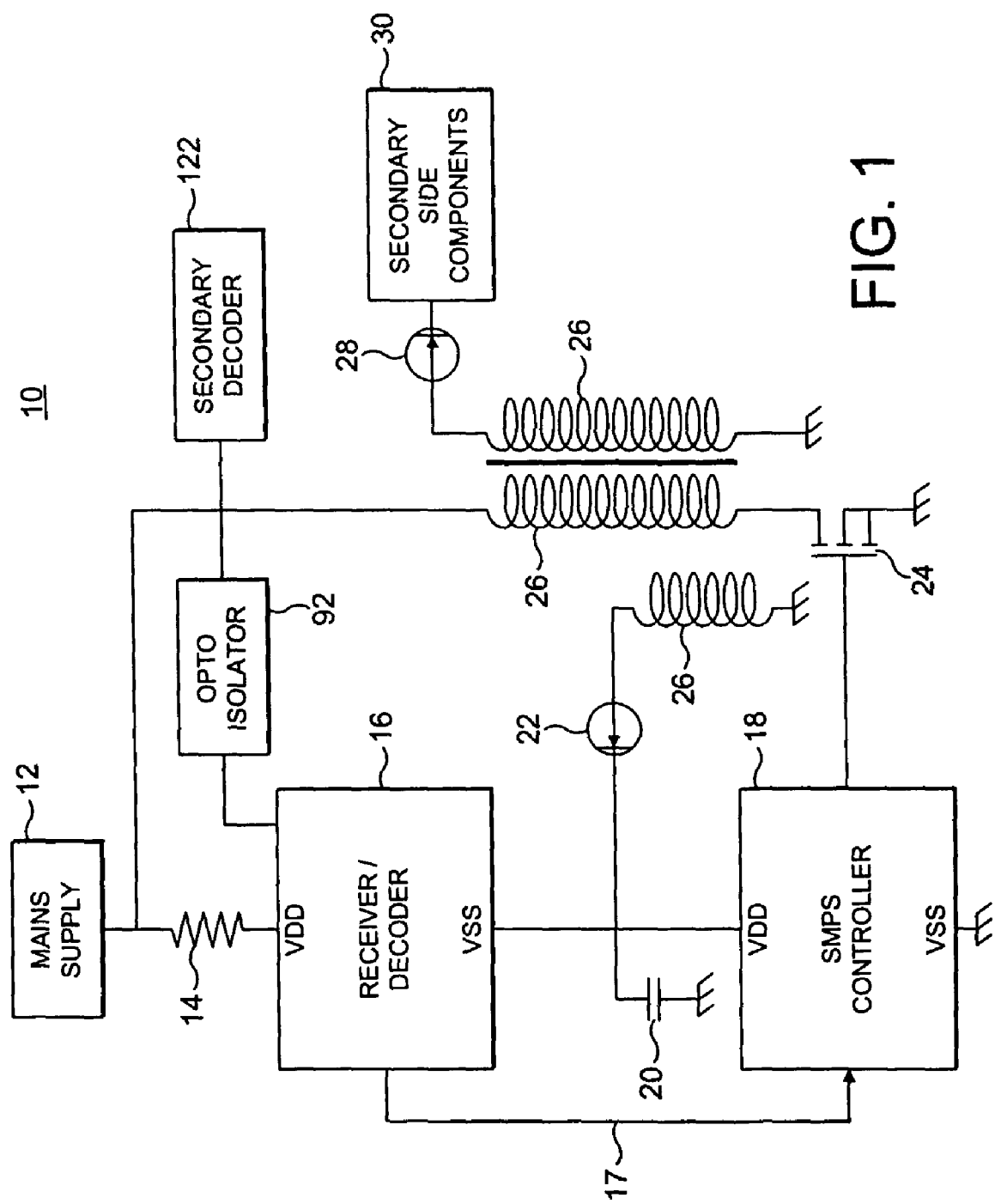
FIG. 1 is a block diagram of an electronic device configured to reduce standby power consumption in accordance with embodiments of the present invention.

One or more specific embodiments of the present invention will be described below. Turning initially to FIG. 1, a block diagram of an electronic device configured to reduce standby power consumption in accordance with embodiments of the present invention is illustrated and generally designated by the reference numeral 10. In one embodiment, the electronic device 10 is a television or other video display device. In alternate embodiments, the electronic device 10 can be a variety of consumer electronics including, but not limited to, video cassette recorders, digital video disk ("DVD") players, digital video recorders, audio or video receivers, computers, cameras, and so forth. In still other embodiments, the electronic device 10 may comprise remote activation systems, such as those routinely found in automobiles or security systems. Further, those of ordinary skill in the art will appreciate that the above recited embodiments are merely exemplary and thus, not intended to be exclusive.

As illustrated in FIG. 1, the electronic device 10 may comprise a mains supply 12. The mains supply 12 is configured to supply the operating power, for example 150 volts, for the electronic device 10. The mains supply 12 may be coupled to a current limiting resistor 14 or another current source (not shown). As will be described in greater detail below, the resistor 14 may be selected to draw sufficient current from the mains supply 12 to supply a receiver 16 and a switch mode power supply ("SMPS") controller 18, with operating power. In one embodiment, the receiver 16 is configured to receive a "power-on" command and to generate an "enable" signal 17 to a SMPS controller 18. In another embodiment, the receiver 16 may be configured to receive a command to switch from a first mode of operation to a second mode of operation. For example, the receiver 16 may receive a command to switch from a low power operating mode to a normal operating mode.

In one embodiment, the receiver 16 comprises an infrared ("IR") receiver in combination with an on/off IR decoder for decoding the power-on signal received by the IR receiver. In an alternate embodiment (illustrated in FIG. 2), the receiver 16 may comprise an IR receiver in series with the SMPS controller 18 with the on/off IR decoder arrayed in parallel with the IR receiver. In this configuration, the on/off decoder is configured to generate the enable signal 17. In yet another embodiment, the receiver 16 is a radio frequency ("RF") receiver and an RF decoder. Lastly, in still other alternate embodiments, the receiver 16 may be configured to receive and decode other suitable forms of wired or wireless signals.

As illustrated in FIG. 1, the SMPS controller 18 is coupled in series between the receiver 16 and ground. As such, those of ordinary skill in the art will appreciate that the ground connection (VSS) on the receiver 16 is coupled to the supply connection (VDD) on the SMPS controller 18. Those of ordinary skill in the art will appreciate that this serial layout consumes less power than the conventional, parallel orientations, of the receiver 16 and the SMPS controller 18.

As illustrated, the electronic device 10 may also include a voltage reservoir formed by a capacitor 20 and a diode 22 coupled between the receiver 16 and the SMPS controller 18. When electronic device 10 is in the standby mode of operation, transformer 26 is in a non-energized state which reverse biases diode 22, thus allowing the voltage node connecting the VSS terminal of receiver 16, the VDD terminal of SMPS controller 18 and a terminal of capacitor 20 to be disconnected from the secondary winding of transformer 26. Next, the SMPS controller 18 may also be coupled to an insulated gate bipolar transistor ("IGBT") 24. In one embodiment, when the SMPS controller 18 receives the enable signal 17, the SMPS controller 18 is configured to enable the IGBT 24. Once enabled, the IGBT 24 activates the transformer 26 and allows power to pass through a diode 28 to secondary side components 30. Also when transformer 26 is activated, diode 22 is rendered conductive, thus establishing the VDD terminal of controller 18 at an operating potential established by the controller 18 and a secondary winding of transformer 26. Once the secondary side components 30 have been powered, user commands may pass directly from the receiver 16 to the secondary side components (i.e., normal, non-standby or run-mode operation) 30. In one embodiment, the secondary side comprises a microprocessor 122 configured to decode a variety of command signals besides the power-on command.

Figure 2:
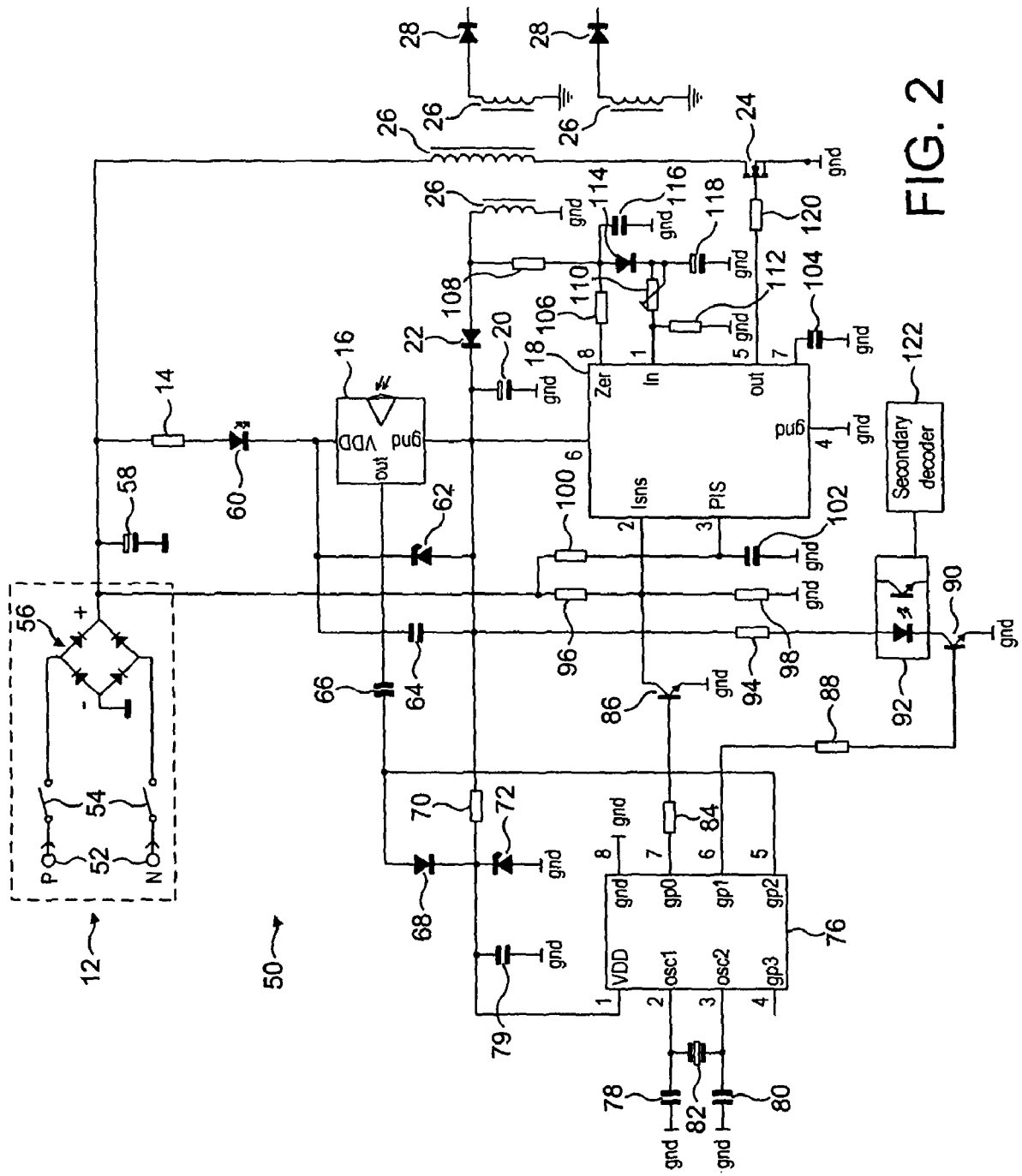
FIG. 2 is a schematic diagram of an electronic device configured to reduce standby power in accordance with embodiments of the present invention.

FIG. 2 is schematic diagram of an exemplary electronic device 50 configured to reduce standby power consumption in accordance with embodiments of the present invention. For simplicity, like reference numerals have been used to designate those features previously described in reference to FIG. 1. The electronic device 50 includes the mains supply 12. In the illustrated embodiment, the mains supply 12 comprises a plurality of power supply lines, also referred to as the "mains" 52, a plurality of switches 54 coupled to each of the mains 52, and a bridge circuit 56 for rectifying the power transmitted through the mains 52. The mains supply 12 may be coupled to a capacitor 58 for stabilizing the power generated by the mains supply 12. In one embodiment, the capacitor 58 comprises a 100 microfarad capacitor.

The capacitor 58 may be coupled to the resistor 14 which was described above. In one embodiment, the resistor 14 comprises a 270 kilo Ohm ("kOhm") resistor that generates a current of 1.2 milliamps. The resistor 14 may be coupled to a light emitting diode ("LED") 60 that indicates current flow through the resistor 14.

As illustrated, the LED 60 may be coupled to the receiver 16, the diode 62, and the capacitor 64. As described above, the receiver 16 is configured to receive at least a "power-on" signal or command from an external device, such as a remote control. In one embodiment, the receiver 16 comprises an IR receiver, such as a TSOP 11 Series IR receiver module produced by Vishay Semiconductors or an 8-bit AVR microcontroller produced by Atmel Corporation. Those of ordinary skill in the art will appreciate that the diode 62 and the capacitor 64 may be configured to stabilize the voltage across the receiver 16. In one embodiment, the capacitor 64 is a 470 nanofarad ("nF") capacitor and the diode 62 is a 5V1 zener diode.

As illustrated in FIG. 2, the receiver 16 may be coupled to a capacitor 66 and a diode 68. Those of ordinary skill in the art will appreciate that the capacitor 66 and the diode 68 are employed to clamp the voltage of the signal path via the capacitor 66 to a supply voltage (VDD) of an Infrared ("IR") decoder 76, because the receiver 16 and the IR decoder 76 are on different ground levels. The diode 68 may be coupled to a resistor 70, a zener diode 72, and a capacitor 74. The resistor 70, the diode 72, and the capacitor 74 may be configured to provide the voltage VDD to the IR decoder 76. In one embodiment, the resistor 70 is a 22 kOhm resistor, the zener diode 72 is a 3V3 diode, and the capacitor 74 is a 1 microfarad capacitor. In this embodiment, the resistor 70, the diode 72, and the capacitor 74 are configured to generate a voltage of 3.3 volts for the VDD input of the IR decoder 76.

The IR decoder 76 may be configured to receive an input from the receiver 16 and to determine whether that input comprises a power-on command. During standby mode, a transistor 86 is turned "on" by IR decoder 76 through resistor 84. If the output from the receiver 16 is a power-on command, the IR decoder 76 may switch "off" transistor 86 via resistor 84. In addition, the IR decoder 76 may switch on a transistor 90 via a resistor 88. As will be described in greater detail below, turning off the transistor 86 and enabling the transistor 90 may be part of a sequence of events that brings the electronic device 50 out of the standby mode. In one embodiment, the IR decoder 76 may also be coupled to a capacitor 78, a capacitor 80, and an oscillator 82. In one embodiment, the IR decoder 76 is a PIC 12F629 low power microcontroller, the resistor 84 is a 10 kOhm resistor, and the resistor 88 is a 10 kOhm resistor. Moreover, the capacitor 78 may comprise a 100 picofarad ("pF") capacitor, the capacitor 80 may comprise a 100 pF capacitor, and the oscillator 82 may comprise a low frequency (e.g., 100 kilohertz) oscillator. Further, while not illustrated in FIG. 2, those of ordinary skill in the art will appreciate that in alternate embodiments, the IR decoder 76 can either be integrated into the receiver 16 or arrayed in series between the receiver 16 and the SMPS controller 18.

As stated above, when the IR decoder 76 receives a signal indicative of a power-on command, the IR decoder 76 may disable the transistor 86. Once disabled, the transistor 86 allows normal run mode operation of the switch mode power supply by enabling the divider formed by resistors 96, 98. Resistors 96, 98 are chosen to bias controller 18 pin 3 into an active region. As illustrated in FIG. 2, the voltage divider created by the resistor 96 and the resistor 98 is coupled to a primary voltage monitoring input pin (illustrated as "ISNS") of the SMPS controller 18, and the resistor 100 and the capacitor 102 are coupled to a primary current input reference pin (illustrated as "PIS") of the SMPS controller 18 to stabilize foldback current limiting for higher mains voltages. Those of ordinary skill in the art will appreciate that applying voltages to each of these inputs enables the SMPS controller 18. In one embodiment, the resistor 96 comprises a 100 mega Ohm resistor and the resistor 98 comprises a 105 kOhm resistor. In this configuration, the voltage divider formed by the resistor 96 and the resistor 98, may generate 1.7 volts on the ISNS input of the SMPS controller 18. In this embodiment, the resistor 100 may comprise a 1 mega Ohm resistor and the capacitor 102 may comprise a 1 nF capacitor.

As stated above, if the IR decoder 76 receives the signal indicative of a power-on command, the IR decoder 76 may enable the transistor 90. Once enabled, the transistor 90 may "open up" a path for current through the resistor 94 to an optocoupler 92. As described above, the IR decoder 76 may be configured to only decode the power-on command to reduce standby power consumption. Once powered on, however, the electronic device 10 may be configured to decode a variety of other suitable signals or commands. For this reason, once powered the optocoupler 92 serves as a pass-through for commands from the IR receiver 16 to another IR decoder 122 amongst the secondary side components. Unlike the IR decoder 76, the IR decoder 122 is configured to decode signals in addition to the power-on command. For example, IR decoder 122 may be configured to receive channel change commands or volume adjustments for a television. In one embodiment, the resistor 94 may comprise a 10 kOhm resistor. IR decoder 122 may be any of a number of control microprocessors or special purpose control decoders generally available.

Returning to the SMPS controller 18. The SMPS controller 18 may be any suitable form of power control microprocessor or microcontroller. In one embodiment, the SMPS controller 18 is a TDA 4605-3 Bipolar Integrated Circuit produced by Siemens Semiconductor. In another embodiment, the SMPS controller 18 is a FA1384X series power supply controller produced by Fuji Semiconductor.

The supply voltage input pin (illustrated as ("VDD") of the SMPS controller 18 may be coupled to the voltage reservoir formed by the capacitor 20 and the diode 22. In one embodiment, the capacitor 20 comprises a 47 microfarad capacitor. In addition, as illustrated in FIG. 2, the secondary voltage information pin (illustrated as "In") and the oscillator feedback input (illustrated as "Zer") of the SMPS controller 18 are coupled to resistors 106, 108, 110, 112, a diode 114, and capacitors 116 and 118. Those of ordinary skill in the art will appreciate that the resistors 106, 108, 110, the diode 114, and the capacitors 116 and 118 may be configured to produce a regulating input on the secondary voltage information pin and input isolation feedback on the oscillation feedback pin. In one embodiment, the resistor 106 comprises a 10 kOhm resistor, the resistor 108 comprises a 4 kOhm resistor, the resistor 110 comprises a 2 kOhm resistor, the capacitor 116 comprises a 4 NF capacitor, and the capacitor 118 comprises a 1 microfarad capacitor.

As described above, a voltage applied to the ISNS input of the SMPS controller 18 may enable the SMPS controller 18. The enabled SMPS controller 18 may generate a voltage/current from an output pin (illustrated as "out") across a resistor 120. This output voltage/current may enable the IGBT 24. Once the IGBT 24 is enabled, the secondary side transformer 26 begins to draw power from the mains supply 12. This power is passed across the transformer 26 via the diode 28 to the secondary side components 30, which enables the electronic device to function normally. In one embodiment, the resistor 120 comprises a 47 ohm resistor.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus comprising:
a power controlling means which is responsive to a control signal for selecting a low power mode of operation or a normal mode of operation;
a source of operating voltage, the source coupled through a current limiting means to provide operating current to the power controlling means and to a means for providing said control signal when the apparatus is operating in the low power mode; and
wherein the power controlling means and the said means for providing said control signal, having a ground connection of the said means for providing said control signal coupled to a voltage supply connection of the power controlling means, are arranged for supply current to flow in series there through.

2. The apparatus of claim 1, wherein the providing means comprises an infrared receiver.

3. The apparatus of claim 1, wherein a supply current to the controlling means at least partially flows through the providing means when the power supply is in one of the operating modes.

4. The apparatus of claim 1, wherein the controlling means comprises a power supply microcontroller.

5. An electronic device comprising:
a source of operating voltage generating an operating supply current which is coupled through a current limiting device to remote control signal receiver circuitry and to power supply control circuitry; and
said power supply control circuitry having said operating supply current coupled in series with the receiver circuitry, wherein a around connection of the receiver circuitry is coupled to a voltage supply connection of the power supply control circuitry and wherein the power supply control circuitry operates in a low power mode or a normal power mode.

6. The electronic device of claim 5, wherein the receiver circuitry comprises an infrared receiver.

7. The electronic device of claim 6, wherein the receiver circuitry comprises an infrared decoder.

8. The electronic device of claim 5, comprising an infrared decoder coupled in parallel with the power supply control circuitry, wherein the infrared decoder is configured to decode a power-on command.

9. The electronic device of claim 8, wherein the infrared decoder is configured to enable the power supply control circuitry when the infrared decoder decodes the power-on command.

10. The electronic device of claim 8, wherein the infrared decoder is configured to ignore any commands except the power-on command.

11. The electronic device of claim 5, comprising secondary side components coupled to the power supply control circuitry, wherein the secondary side components comprise a video display.

12. The electronic device of claim 5, wherein the electronic device comprises a television system.

13. The electronic device of claim 5, wherein the receiver circuitry comprises a radio frequency receiver.

14. A method comprising:
receiving a supply current at a receiver;
limiting the supply current;
transmitting, while in a low power mode of operation, the supply current from a around connection of the receiver to a voltage supply connection of a power supply controller via a series connection with the receiver;
receiving an electronic command signal indicative of a user request for the power supply controller at the receiver;
decoding the electronic command signal; and
transmitting the decoded electronic command signal to power supply controller.

15. The method of claim 14, wherein receiving the current comprises receiving the current at an infrared receiver.

16. The method of claim 15, wherein decoding the electronic command signal comprises decoding the electronic command signal with an infrared decoder.

17. The method of claim 14, wherein receiving the current comprises receiving less than 1.2 milliamps of current.

18. The method of claim 14, wherein receiving the electronic command signal comprises receiving a power-on command.

19. The method of claim 18, wherein the electronic command signals are transmitted to a secondary decoder for decoding commands other than said power-on command.

* * * * *